US009225011B2

(12) United States Patent
Wang et al.

(10) Patent No.: US 9,225,011 B2
(45) Date of Patent: Dec. 29, 2015

(54) DOPED CARBON-SULFUR SPECIES NANOCOMPOSITE CATHODE FOR LI—S BATTERIES

(71) Applicant: The Penn State Research Foundation, University Park, PA (US)

(72) Inventors: Donghai Wang, State College, PA (US); Tianren Xu, State College, PA (US); Jiangxuan Song, State College, PA (US)

(73) Assignee: THE PENN STATE RESEARCH FOUNDATION, University Park, PA (US)

( * ) Notice: Subject to any disclaimer, the term of this patent is extended or adjusted under 35 U.S.C. 154(b) by 239 days.

(21) Appl. No.: 13/938,527

(22) Filed: Jul. 10, 2013

(65) Prior Publication Data

US 2014/0017569 A1 Jan. 16, 2014

Related U.S. Application Data

(60) Provisional application No. 61/669,859, filed on Jul. 10, 2012.

(51) Int. Cl.
| | |
|---|---|
| *H01M 4/136* | (2010.01) |
| *H01M 4/133* | (2010.01) |
| *H01M 10/052* | (2010.01) |
| *H01M 4/62* | (2006.01) |

(52) U.S. Cl.
CPC .............. *H01M 4/136* (2013.01); *H01M 4/133* (2013.01); *H01M 4/625* (2013.01); *H01M 10/052* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 4,835,074 A | 5/1989 | Bolster et al. | |
| 6,210,831 B1 | 4/2001 | Gorkovenko et al. | |
| 6,309,778 B1 | 10/2001 | Skotheim et al. | |
| 6,423,193 B1 | 7/2002 | Miller et al. | |
| 6,436,583 B1 | 8/2002 | Mikhaylik | |
| 8,735,002 B2* | 5/2014 | Scordilis-Kelley et al. | .. 429/314 |
| 2010/0062333 A1 | 3/2010 | Chuang et al. | |
| 2010/0143803 A1 | 6/2010 | Park | |
| 2011/0070495 A1 | 3/2011 | Ban et al. | |
| 2011/0165466 A1 | 7/2011 | Zhamu et al. | |
| 2011/0200883 A1* | 8/2011 | Cui et al. | ................... 429/231.4 |

OTHER PUBLICATIONS

International Search Report and Written Opinion for PCT/US2013/049870 dated Oct. 10, 2013.
Ji, Xiulei et al., A Highly Ordered Nanostructured Carbon—Sulphur Cathode for Lithium—Sulphur Batteries, Nature Materials, 2009, 500-506, vol. 8, Macmillan Publishers Limited.
Kim, Nam Dong et al., Electrochemical Capacitor Performance of N-Doped Mesoporous Carbons Prepared by Ammoxidation, Journal of Power Sources, 2008, 671-675, 180, Elsevier B. V.
(Continued)

*Primary Examiner* — Patrick Ryan
*Assistant Examiner* — Wyatt McConnell
(74) *Attorney, Agent, or Firm* — Buchanan Ingersoll & Rooney PC

(57) ABSTRACT

We report a heteroatom-doped carbon framework that acts both as conductive network and polysulfide immobilizer for lithium-sulfur cathodes. The doped carbon forms chemical bonding with elemental sulfur and/or sulfur compound. This can significantly inhibit the diffusion of lithium polysulfides in the electrolyte, leading to high capacity retention and high coulombic efficiency.

16 Claims, 14 Drawing Sheets

(56) References Cited

OTHER PUBLICATIONS

Liu, Ruili et al., Nitrogen-Doped Ordered Mesoporous Graphitic Arrays With High Electrocatalytic Activity for Oxygen Reduction, Angew. Chem. Int. Ed., 2010, 2565-2569, 49, Wiley-VCH Verlag GmbH & Co., KGaA, Weinheim.

Shin, Hyeon-Jin et al., Control of Electronic Structure of Graphene by Various Dopants and Their Effects on a Nanogenerator, J. Am. Chem. Soc., 2010, 15603-15609, American Chemical Society.

Yang, Zhi et al., Sulfur-Doped Graphene as an Efficient Metal-Free Cathode Catalyst for Oxygen Reduction, www.acsnano.org, 2012, 205-211, vol. 6 No. 1, American Cancer Society.

Zhang, Yongguang et al., Development in Lithium/Sulfur Secondary Batteries, The Open Materials Science Journal, 2011, 215-221, 5, Bentham Open.

* cited by examiner

DOPED CARBON-SULFUR SPECIES NANOCOMPOSITE CATHODE FOR LI—S BATTERIES

CROSS-REFERENCE TO RELATED APPLICATIONS

This application claims priority to U.S. provisional patent application No. 61/669,859, filed on Jul. 10, 2012. That application is incorporated by reference herein.

GOVERNMENT SPONSORSHIP

This invention was made with government support under Grant No. DE-EE0005475, awarded by the Department of Energy. The Government has certain rights in the invention.

BACKGROUND OF THE INVENTION

1. Field of the Invention

Embodiments of the invention relate to doped carbon-sulfur species nanocomposites, as well as methods of making them. Further embodiments relate to objects that may be made from these composites, including lithium-sulfur batteries and battery components.

2. Background of the Related Art

The lithium-sulfur (Li—S) battery has attracted increasing attention as a next-generation energy storage device for plug-in hybrid electric-vehicles and electric vehicles. This is largely due to its extremely high theoretical specific capacity (1672 mA h g$^{-1}$) and energy density (2600 Wh Kg$^{-1}$). In addition, sulfur is low-cost, abundantly available, and eco-friendly.

Li—S batteries operate by reaction of sulfur with lithium to form lithium polysulfides (i.e., $Li_2S_x$, 8≤x≤3), lithium disulfide ($Li_2S_2$), and finally lithium sulfide ($Li_2S$) during the discharge process, with the reverse occurring during the charge process.

Despite these considerable advantages, practical realization of a Li—S battery is hindered by several issues. First, the low electrical conductivity of sulfur (5×10$^{-30}$ S cm$^{-1}$) limits utilization of active materials and leads to a poor capacity.

Second, a significant impediment to widespread adoption of lithium-sulfur batteries is the diffusion of polysulfide, called the "polysulfide shuttle effect." The shuttle effect results in fast capacity fading and low coulombic efficiency. This occurs when intermediate lithiation compounds, lithium polysulfides, dissolve in organic electrolyte and are deposited on the anode surface. This causes a progressive decrease in coulombic efficiency, loss of active materials, and capacity fading with cycling. Third, electrolyte consumption upon reaction with the Li anode results in capacity fading during the charging/discharging process.

To address these challenges, various strategies have been explored. These include design of new electrolytes, inclusion of protecting layers, and novel sulfur-carbon and conducting polymer cathodes.

Still, the development of high-performance cathodes remains a significant challenge. Many initiatives have synthesized sulfur-carbon nanocomposite cathodes to improve contact between sulfur and carbon. This may result in increased conductivity of the electrodes, leading to enhanced utilization of the active sulfur.

Two main approaches to limit capacity loss upon cycling sulfur-based cathodes have been developed. One approach to circumvent capacity fade has been to tether sulfur within a cathode material with an organic molecular chain. This approach attempts to prevent the sulfur from migrating out of the cathode material and becoming electrochemically useless by using the organic molecular chain to attach to the sulfur and/or sulfur-containing species. Such an approach has been investigated and reported in U.S. Pat. Nos. 4,833,048; 5,162,175; 5,516,598; 5,529,860; 5,601,947; 6,117,590; and 6,309,778. Those patents are incorporated by reference herein.

A second approach to limit the capacity fade of a lithium battery due to sulfur migration from the cathode has been to create confinement and physical sorption between an additive and polysulfides created within the battery system. This approach has been disclosed in U.S. Pat. Nos. 5,532,077; 6,210,831; 6,406,814; and 8,173,302. Those patents are incorporated by reference herein.

Unfortunately, the first approach is limited by the non-conductive nature of the organic molecule chain. The second approach is limited by the weak anchoring effect on polysulfides by physical sorption in conductive matrix.

BRIEF SUMMARY OF THE INVENTION

Embodiments presented herein provide a new approach for a high-performance lithium sulfur battery. Embodiments use heteroatom-doped carbon (denoted as X-PC, where X is the heteroatom element for doping) to form doped carbon-sulfur species nanocomposites. The nanocomposites are denoted as X-PC-SY, where Y is the mass percentage of sulfur species in the composites.

In this nanocomposite, the heteroatom-doped carbon serves not only as a conductive network in the electrode but also strongly adsorbs elemental sulfur and sulfur compound via chemical adsorption. This strong adsorption mitigates diffusion loss of sulfur, and ensures high coulombic efficiency as well as a long cycle life. Dopant element, X, can be one or a combination from the group of boron, nitrogen, oxygen, fluorine, sulfur, chlorine, and phosphorus.

In some embodiments the doped carbon is nanoporous. The porosity in the carbon may include, either singly or in combination, micropores (pore size smaller than 2 nm), mesoporous (pore size from 2-20 nm), macropores (pore size larger 20 nm). In other embodiments the doped carbon is non-porous.

Cathodes and batteries formed from these materials are also disclosed.

One preferred embodiment is a nitrogen-doped porous carbon (denoted as N-PC). The nitrogen-doped carbon material has strong interaction with sulfur and lithium polysulfide through chemical bonding. This can significantly inhibit the diffusion of lithium polysulfide in the electrolyte, leading to high capacity retention (>800 mAh g$^{-1}$ after 100 cycle @0.1C, 1C=1672 mAh g$^{-1}$) and high coulombic efficiency (>93%).

Another preferred embodiment is nitrogen-doped graphene (denoted as N-G). The N-G materials show a strong interaction with sulfur though chemical bonding. This interaction can retard the dissolution of lithiated sulfur product (soluble polysulfide). High capacity and capacity retention can be achieved using N-G for lithium-sulfur batteries.

In embodiments of the invention, the sulfur species can be elemental sulfur, lithium sulfide, lithium polysulfides or combinations of the three. These are typically nanocomposites.

Embodiments may include carbon; a heteroatom dopant; and sulfur, wherein said carbon and said heteroatom dopant are connected by covalent bonds, and wherein the sulfur is at least partly bonded to the carbon and the heteroatom dopant by chemisorption.

In some embodiments the carbon is porous, and in others it is nonporous. When the carbon is porous, it may include pores of a size selected from the group consisting of nanopores, mesopores, and micropores.

In some embodiments the material includes less than 50%, by weight, of dopant. In some embodiments the weight of the sulfur species in the material is more than 5% and less than 100% by weight. At least a portion of the sulfur species may be elemental sulfur. In some embodiments the dopant is nitrogen, and in some of those embodiments the nitrogen and carbon are present in a ratio, by weight, ranging from 0.1 to 1.65.

Electrodes include materials of the invention may include, for example, at least one binder and at least one conductive additive. These electrodes may be combined with negative electrodes and electrolytes in a battery.

In some embodiments we provide a material including heteroatom-doped carbon and at least one of lithium sulfide and lithium polysulfides. The heteroatom-doped carbon includes carbon with a covalent bond to a heteroatom dopant; and the lithium sulfide and lithium polysulfide is at least partly bonded to the doped carbon by chemisorption.

In the lithium polysulfides, which have the formula $Li_2S_x$, x is greater than 2. In some embodiments x is between 1 and 8. In other embodiments it is between 2 and 8. This material may also be used in a battery.

BRIEF DESCRIPTION OF THE FIGURES

FIG. 3.

FIG. 6.

FIG. 8.

FIG. 9.

DETAILED DESCRIPTION OF THE INVENTION

Figure 1:
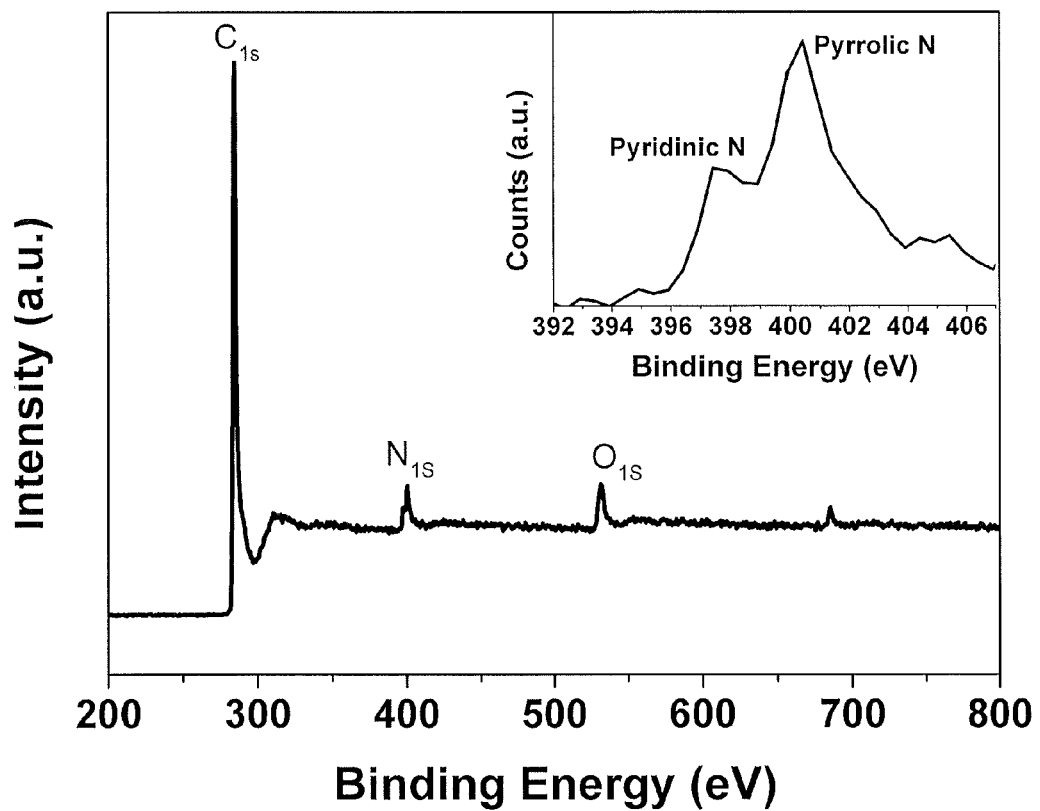
FIG. 1. Main: XPS survey spectrum of N-PC. Inset: High-resolution spectrum of the N 1 s peak. The peaks at 397.8 eV and 400.3 eV correspond to pyridinic and pyrrolic N, respectively, while the shoulder at 402.3 eV may be due to quaternary N.

We provide a doped carbon structure that integrates sulfur through chemisorption. In prior art carbon/sulfur structures, the sulfur is retained (or at least intended to be retained) in the structure through physical interaction with the carbon; that is, the various pores of the carbon prevent movement of the sulfur and therefore are expected to decrease the polysulfide shuttle effect. Although embodiments of the invention described herein may make use of porous carbon, that use is largely done to take advantage of the larger surface area that the porous carbon provides. In embodiments of the invention, the sulfur is retained (or at least partially retained) in the carbon/heteroatom structure through chemisorption. This provides a substantial decrease in any polysulfide shuttle effect and a corresponding increase in the performance of batteries using materials of the invention for anode construction.

Embodiments of the invention are described in the context of nitrogen-doped carbon. Those of skill in the art will appreciate that in typical embodiments of the invention one or more other dopants may also be used. For example, carbon may be doped with one or more of boron, phosphorus, fluorine, nitrogen, oxygen, sulfur, and chloride. Use of these dopants would enhance the adsorption ability of carbon materials on sulfur and lithium polysulfide, leading to a high capacity and cycle stability.

Preparation of heteroatom doped-carbon species composite articles of the invention is not limited by the method of heteroatom doping. Dopants may be introduced either before or after carbonization. For example, one way to prepare doped carbon is by homogeneously mixing carbon precursor with dopant-containing precursors before a carbonization process. Suitable dopant-containing precursors include, for example, but are not limited to polymers, nitrogen containing oligomers, gelatin, nitrogen-contained ionic liquid, and others.

Multiple preparation methods may be suitable to make embodiments of the invention. For example, in one embodiment nitrogen-doped carbon is prepared through an in-situ hybridization approach using commercial melamine-formaldehyde as polymer precursor. Such a method not only affords the uniform dispersion of nitrogen but also provides scalable fabrication. Another way to prepare nitrogen-doped carbon is introduction of a nitrogen-containing atmosphere during a top-down carbonization process.

Hierarchical three-dimensional nanoporous nitrogen doped carbon materials reported herein are suitable for construction of cathodes for high performance lithium-sulfur batteries. Compared with cathodes based on nanoporous carbon, the nitrogen doped carbon composites show much higher capacity and cycling stability. This is true, for example, with a sulfur content of 65-75 wt %, preferably 70 wt %. More importantly, unlike PC-S cathode, of which the battery performance is highly reliant on the sulfur content and will drop with the increase of sulfur content, the X-PC composites show significantly better cycling stability with increasing sulfur content. This is even the case at levels up to 80 wt % sulfur where sulfur are not confined within nanopores. In some embodiments even higher percentages are possible. Although not wishing to be bound by theory, we believe that the exceptional performance of the nitrogen-doped carbon is derived from a strong chemical interaction of dopant elements with the sulfur and polysulfides.

As reported below, in one embodiment carbon may be given a nanoporous structure through triblock copolymer synthesis. Other suitable methods for preparation of nanoporous carbon include use of other soft and hard templates. These may further include use of surfactants and hydrophilic block copolymers. Suitable soft templates may include, for example, but are not limited to sodium dodecyl sulfate (SDS), disodium monolauryl sulfosuccinate (DMS), cetyltriethylammonium bromide (CTAB), cetyltriethylammonium bromide (CTAB), P123, PS-b-PEO and others. Suitable hard templates may include, for example, but are not limited to inorganic precursors. These may be, for example, particles including $SiO_2$, $TiO_2$, $CaCO_3$, $Fe_2O_3$, and others.

In some embodiments of the invention, the dopant is incorporated into carbon in a calcination process before the porosity is created. Many precursors containing dopant elements can be used as the source of dopant, including dopant-containing polymers, dopant-containing oligomers, gelatin, dopant-containing ionic liquid, and so on. The dopant content in the precursor may be varied to help control the dopant content in the resulting product, with higher amounts of the dopant element in the precursor leading to higher amounts of dopant in the resulting product. The amount of the dopant in the precursor can be, for example, from 1% to 60 wt %, from 10% to 50 wt %, or from 20% to 40 wt %.

In some embodiments of the invention, the dopant, which may be a nitrogen dopant, is incorporated into the carbon in the calcination treated in ammonia gas. An as-formed nanostructured carbon or precursor may be heat treated in ammonia gas at a temperature above 600° C., preferably between 600-1200° C., to form nitrogen doped nanoporous carbon. The nitrogen content in the resulting product can be controlled, and may, for example, range, from 1% to 60 wt %, from 10% to 50 wt %, or from 20% to 40 wt %.

The completed nanoporous structure will typically include one or more of micropores (pore size smaller than 2 nm), mesoporous (pore size from 2-20 nm), macropores (pore size larger 20 nm s). The smaller pores (less than 2 nm) are typically located at the wall of the X-PC frame. Typically the larger pores (larger than 2 nm) are in the bulk matrix.

After the doped carbon has been prepared, sulfur is incorporated into the carbon. In typical embodiments sulfur or a sulfur species (for example, lithium sulfide or lithium polysulfides in solution) is present between 60-80% by weight of the completed doped carbon, in some embodiments between 65-75% by weight, and in some embodiments about 70% by weight. Sulfur incorporation may be accomplished by, for example, grind-mixing of the sulfur and the doped carbon, or grind-mixing of the sulfur species and the doped carbon.

Other embodiments of the invention are directed to cathodes including the nitrogen-doped carbon-sulfur species composites. Typically cathodes will include sulfur and/or lithium sulfide, lithium polysulfides (10-90 wt %) in the doped carbon-sulfur species composite, binder (1-30 wt %) and at least one conductive additive (1-50 wt %). Suitable binder includes, for example, but is not limited to polyvinylidene fluoride (PVDF), alginate, polyacrylic acid, polyethylene oxide, chitosan derivative, and others. The conductive additive can be, for example, but is not limited to, carbon black, carbon nanotube (CNT), graphite, graphene, conducting polymer, and others.

Embodiments of the invention are more fully understood by reference to illustrative examples presented below. Of course, those examples should not be viewed as an exclusive list of methods of practicing the invention or the results that may be obtained, as those of skill in the art will recognize that various modifications may be made to the materials and methods presented herein yet will still be within the scope of the claims.

Example 1

Preparation of Nitrogen-Doped Carbon (N-PC)

The N-PC nitrogen-doped nanoporous carbon was prepared through a facile in-situ strategy. A commercial melamine-formaldehyde ("MF") oligomer was selected as a polymer precursor to provide carbon and nitrogen sources. This offers the feasibility for large scale fabrication.

To get high pore volume and high surface area for sulfur loading and immobilizing, tetraethyl orthosilicate (precursor of $SiO_2$ @ 3-5 nm), amphiphilic triblock copolymers (PEO-PPO-PEO, pluronic F127), and colloidal $SiO_2$ nanoparticles (10-20 nm) were used as soft or hard porous templates. The synthesis included evaporation-induced multicomponent co-assembly to form a homogeneous structure, followed by carbonization and removal of a porous template.

In this example the nanoporous nitrogen doped carbon was prepared by using MF (melamine formaldehyde) as a polymer precursor. Hydrophilic and colloidal silica were used as the soft and hard preparation template. 1.6 g block copolymer was dissolved in 15 ml ethanol with 1.0 g 0.2 M HCl and stirred for 1 h for 40° C., giving a clear solution. Then silica latex and 5.0 g of 20 wt % MF ethanolic solution were added in sequence. After being stirred for another 3 hours, the final transparent solution was transferred into petri dishes. After evaporating the solvent overnight in the hood at room temperature, the film was further cross-linked in the oven at 100° C. for 12 h and 150° C. for 2 hour, respectively. Finally, the products were calcined at 900° C. for 2 h with a temperature increase rate of 1° C./min to obtain three dimensional mesoporous nitrogen doped carbon composites.

Example 2

Method for Preparing Nitrogen-Doped Carbon (N-PC)

In one preparation of X-PC, 1.65 g block copolymer F127 (from Pluronic) was first dissolved in 8 g ethanol with 1.0 g 0.2 M HCl and stirred for 1 hour (h) at 40° C. to afford a clear solution. Next, 2.08 g TEOS (tetraethyl orthosilicate) and 5.5 g 20 wt % resol ethanolic solution were added in sequence. After being stirred for 2 h, the mixture was transferred into large petri dishes. The mixture was left overnight to evaporate ethanol and then heated for 24 h at 100° C. in an oven to thermopolymerize. The as-made products were scraped from the dishes.

Calcination was carried out sequentially in a tubular furnace, first at 350° C. for 3 h and next at 900° C. for 2 h under argon flow to get $PC-SiO_2$ nanocomposites. The heating rate was 1° C./min below 600° C. and 5° C./min above 600° C. The $PC-SiO_2$ nanocomposites were immersed in 2 wt % HF (hydrofluoric acid) solutions to remove silica, leaving porous carbon (PC).

The as-made product was washed by distilled water several times and dried at 80° C. in an oven. Then the PC samples were put in the middle of the tube furnace for N-doping experiments. NH$_3$ flow was induced at a rate of 100 mL/min through the mass-flow controller. A heating rate of 10° C./min was used to heat up the furnace to the designated temperature (700-900° C.) and kept for 2 h to obtain N-PC.

Example 3

Preparation of Boron-Doped Carbon Materials (B-PC)

1.0 g block copolymer was dissolved in 10 ml ethanol with 1.0 g 0.2 M hydrochloric acid (HCl) and stirred for 1 h for 40° C., giving a clear solution. Then silica latex and 5.0 g of 20 wt % phenolic resins ethanolic solution, 0.5 g boric acid were added in sequence. After being stirred for another 2 hours, the final transparent solution was transferred into petri dishes.

After the solvent was allowed to evaporate overnight in the hood at room temperature, the film was further cross-linked in an oven at 100° C. for 12 h and 150° C. for 2 hour, respectively. Finally, the products were calcined at 900° C. for 2 h with a temperature increase rate of 1° C./min to obtain three dimensional mesoporous boron doped carbon composites.

Example 4

Preparation of Nitrogen-Doped Graphene

Graphene oxide (GO) was first synthesized as precursor for nitrogen-doped graphene. GO was prepared by using a modification of Hummers and Offeman's method. 1.0 g graphite, 1.0 g NaNO$_3$, and 50 ml H$_2$SO$_4$ were stirred together in an ice bath. Then 6.0 g of KMnO$_4$ was slowly added. The above solution was transferred to a 35° C. oil bath to form a thick paste. Next, 100 ml water was added, followed by addition of 10 ml of H$_2$O$_2$ (~30%). The warm solution was filtered and washed with 100 ml of water. The filter cake was then dispersed in water and sonication for 5 hours, giving a solution of exfoliated GO.

Melamine was added to the GO solution slowly and stirred at 80° C. for 2 hours. After evaporation of the water, a black power was obtained and carbonized at 900° C. for 2 h to get nitrogen-doped graphene.

Example 4

Preparation of Phosphorus-Doped Carbon Materials (P-PC)

1.0 g block copolymer was dissolved in 10 ml ethanol with 1.0 g 0.2 M HCl and stirred for 1 h for 40° C., giving a clear solution. Then silica latex and 5.0 g of 20 wt % phenolic resins ethanolic solution, 0.5 g phosphoric acid was added in sequence. After being stirred for another 2 hours, the final transparent solution was transferred into petri dishes. After evaporating the solvent overnight in the hood at room temperature, the film was further cross-linked in the oven at 100° C. for 12 h and 150° C. for 2 hour, respectively. Finally, the products were calcined at 900° C. for 2 h with a temperature increase rate of 1° C./min. This led to preparation of three dimensional mesoporous phosphorus doped carbon composites.

In comparison with post treatment for nitrogen doping on carbon materials, in-situ approaches are more controllable for the distribution and content of other hetero-atom elements. In addition, in-situ approaches can avoid the hybridization process at high temperature that may destroy the desired structures.

X-ray photoelectron spectroscopy (XPS) was performed to probe the surface chemical composition of N-PC (FIG. 1). This showed the presence of C, N, and O atoms in N-PC. The binding energy peaks observed in the high-resolution N 1 s profile at 397.8 eV and 400.3 eV (inset of FIG. 1) were attributed to pyridinic and pyrrolic nitrogen, respectively, while the shoulder peak at around 402.3 eV signified the presence of quaternary nitrogen.

Figure 2A:
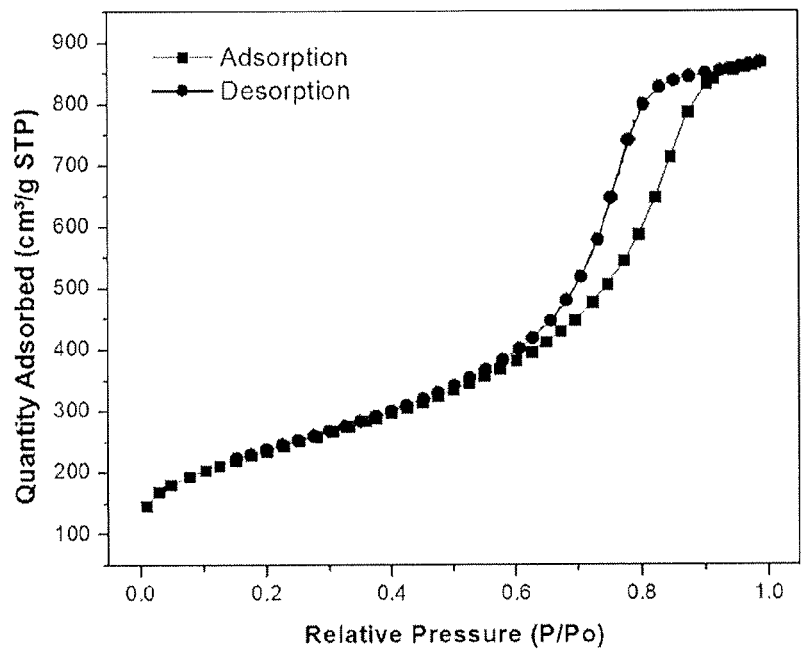
FIG. 2(A) shows $N_2$ sorption isotherms.
Figure 2B:
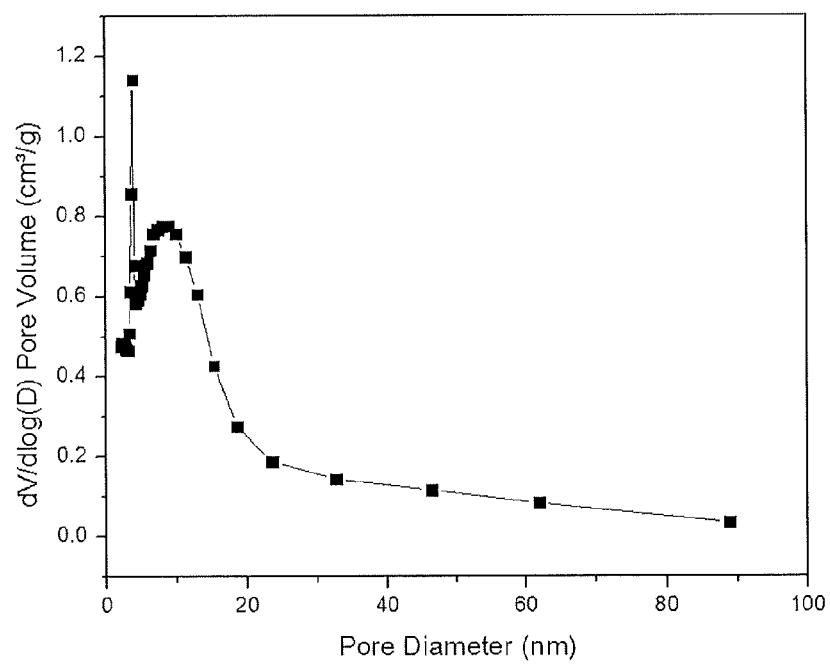
FIG. 2(B) shows pore size distribution curves.
Figure 2C:
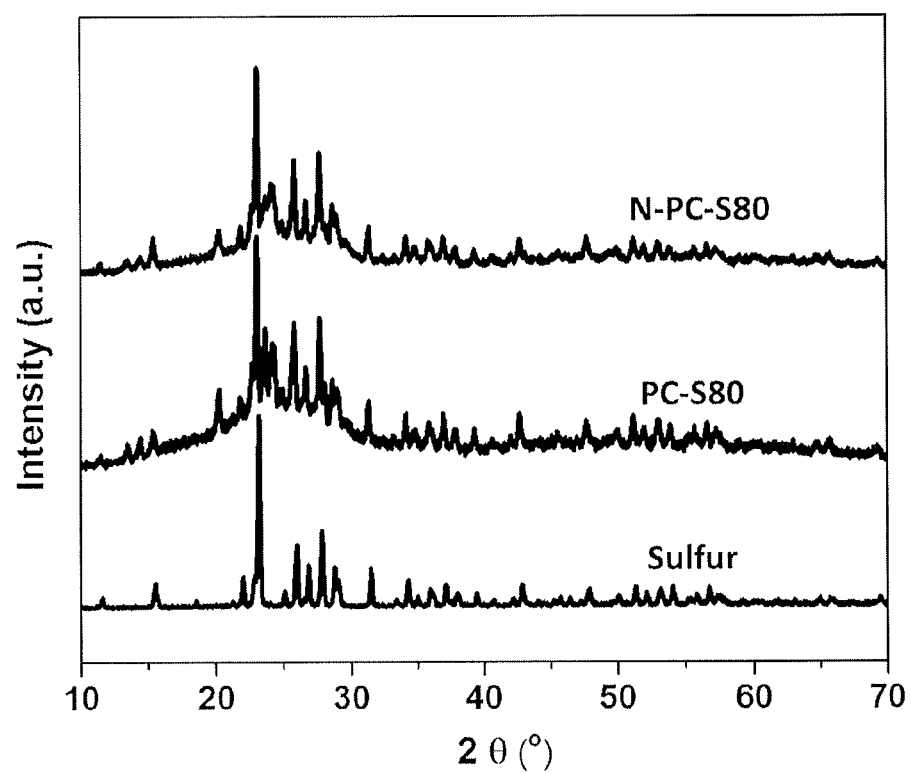
FIG. 2(C) shows N-PC and XRD pattern (bottom) of N-PC-S80, PC-S80 and sulfur. The BET surface area and pore volume of N-PC are 824.30 $m^2/g$ and 1.38 $cm^3/g$, respectively.
Figure 3A:
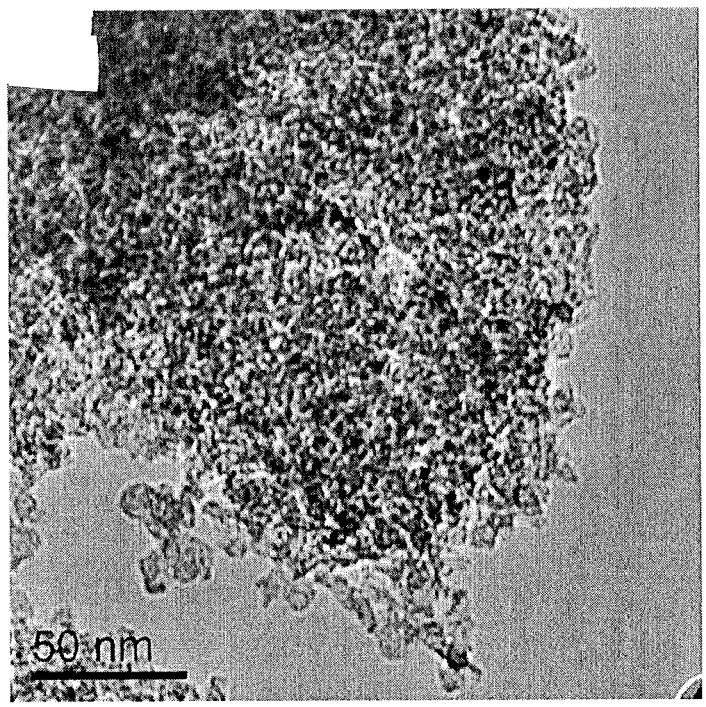
FIG. 3(A) shows a TEM image of an N-PC-S70 nanocomposite.
Figure 3B:
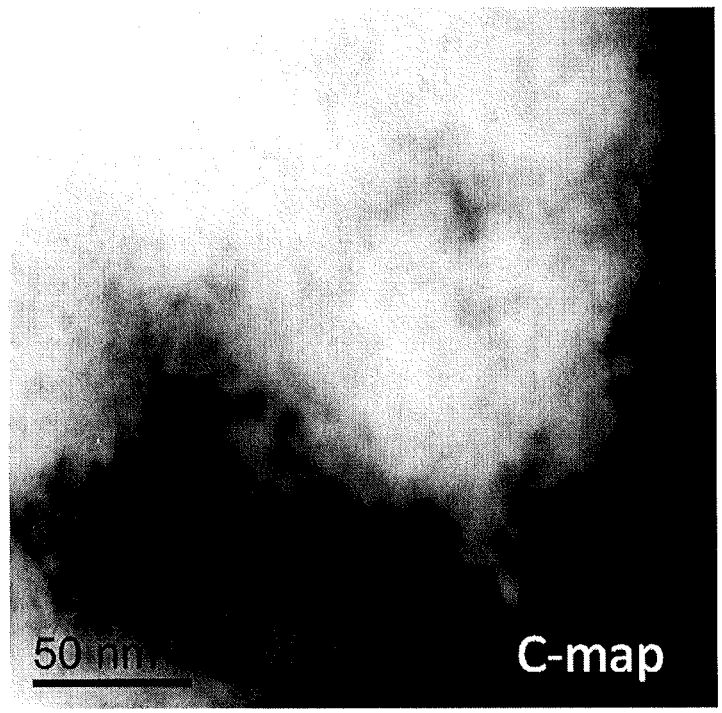
FIG. 3(B) shows a corresponding EELS elemental map of carbon.
Figure 3C:
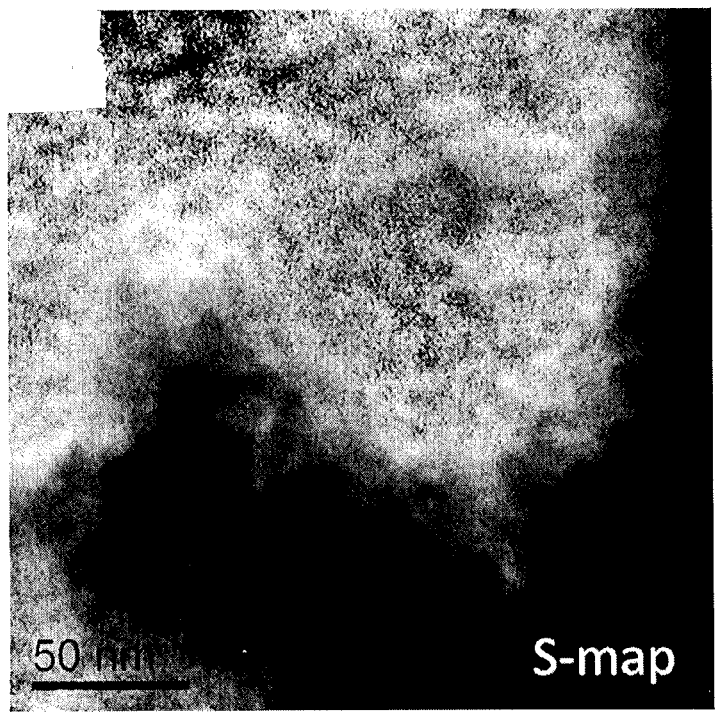
FIG. 3(C) shows a corresponding EELS elemental map of sulfur.
Figure 3D:
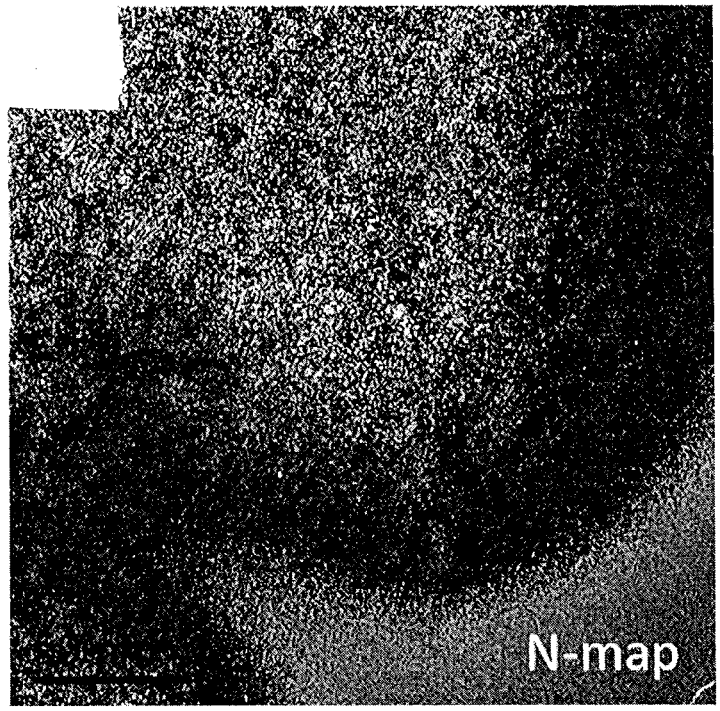
FIG. 3(D) shows a corresponding EELS elemental map of nitrogen.

The pore structure and distribution were investigated by N$_2$ adsorption/desorption isotherm measurement, as shown in FIG. 2(A), FIG. 2(B), and FIG. 2(C). The Brunauer-Emmett-Teller (BET) surface area and Barrett-Joyner-Halenda (BJH) pore volume of N-PC are 824.3 m$^2$/g and 1.38 cm$^3$/g, respectively. The BJH pore size distribution shows that N-PC possesses hierarchical pore structures composed of 2-3 nm diameter mesopores templated from SiO$_2$ formed by the TEOS precursor, intermediate-sized (~4-8 nm diameter) mesopores primarily from the block copolymer, and larger (~10-20 nm diameter) mesopores from the colloidal SiO$_2$ nanoparticles. Above all, the high surface area and pore volume obtained in N-PC are able to accommodate high sulfur loading into the porous conductive network and to immobilize soluble polysulfide species via physical and chemical adsorption.

The X-PC-sulfur nanocomposite was prepared by evaporating a mixture of sulfur species (sulfur, lithium sulfide or lithium polysulfides) solution and X-PC to obtain the nanocomposite or impregnating sulfur in X-PC at 155° C. for 10 h with different sulfur loading (70 wt % and 80 wt %), denoted as X-PC-SY, where Y represents the sulfur weight percentage. Solvent for sulfur species solution can be, but not limited to, carbon disulfide, or tetrahydrofuran. The sulfur species are not necessary to be confined within nanopores of the porous carbon framework, as indicated by XRD studies of N-PC-S80 (FIG. 2(C)). Sulfur reflections peaks in the XRD pattern are clearly observed indicating sulfur are not all confined within nanopores. To demonstrate the effect of nitrogen doping into the carbon materials, a control sample of nanoporous carbon-sulfur (denoted as PC-SY) was made by loading sulfur into nanoporous carbon with similar surface area and pore volume. In the above process, the melted sulfur diffused in to the hierarchical mesopores of nitrogen doped carbon because of the strong adsorption effects derived from the high surface area and functional group resulting from the dopant introduction, instead of physical adsorption and confinement in non-doped carbon based PC-SY. FIG. 1 shows the transmission electron microscopy (TEM) image of Example 1

The uniform elemental distribution arising from the in-situ approach was demonstrated by elements mapping analysis shown in FIG. 3(A)-3(D). The carbon, nitrogen, and sulfur show a similar intensity distribution, indicating the sulfur is homogeneously impregnated into the hierarchical nanoporous nitrogen doped carbon nanocomposite frameworks. These results are consistent with the XRD observations.

Figure 4:
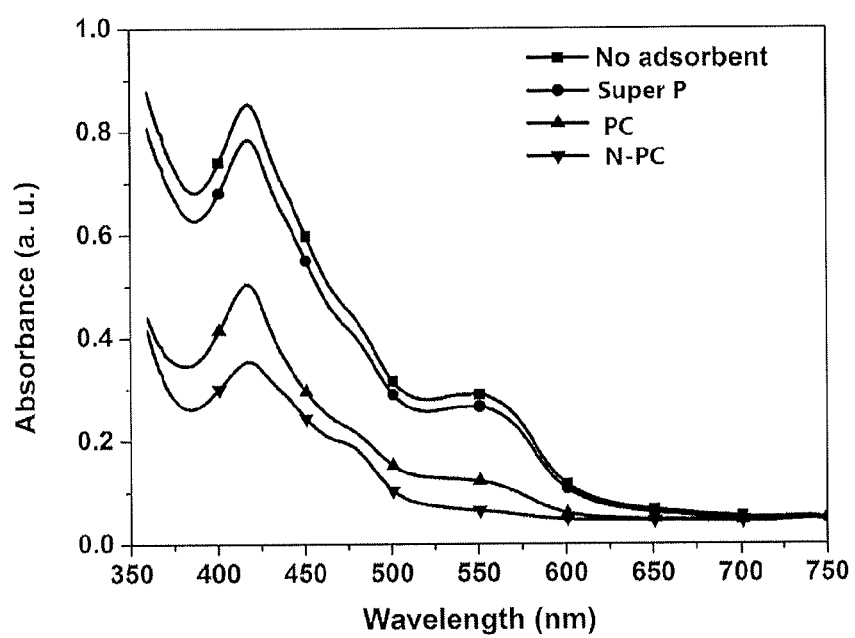
FIG. 4. UV-Vis spectra of polysulfide solution before and after exposure to commercial Super P® carbon, PC, and N-PC.

To better understand the interaction of lithium polysulfide and nitrogen doped carbon nanocomposites, the adsorption effect on lithium polysulfide of PC and N-PC was measured. The lithium polysulfide including the Li$_2$S$_4$, Li$_2$S$_6$, and Li$_2$S$_8$ solution after absorption by PC and N-PC were measured by UV-vis spectra and the results are summarized in FIG. 4. The absorption peaks located at around 420 nm, 476 nm, and 560 nm, are attributable to the characteristic peaks of S$_4^{2-}$, S$_6^{2-}$, and S$_8^{2-}$, respectively, which are well documented in the literature. Compared with the PC, the absorption intensity of polysulfide absorbed by N-PC is much lower than that of PC and commercial Super P® carbon from Timcal (SP), suggesting that the N-PC has much strong absorption ability to lithium polysulfide.

Figure 5:
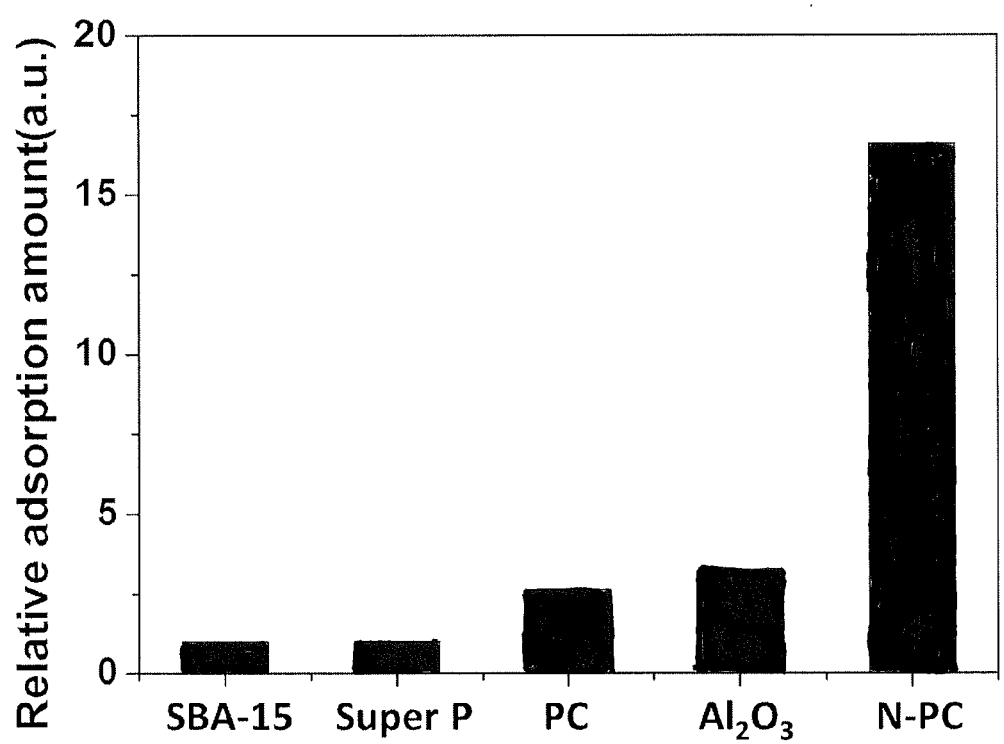
FIG. 5. Relative adsorption of different adsorbents including Super P® carbon, SBA-15, $Al_2O_3$, PC, and N-PC.
Figure 6A:
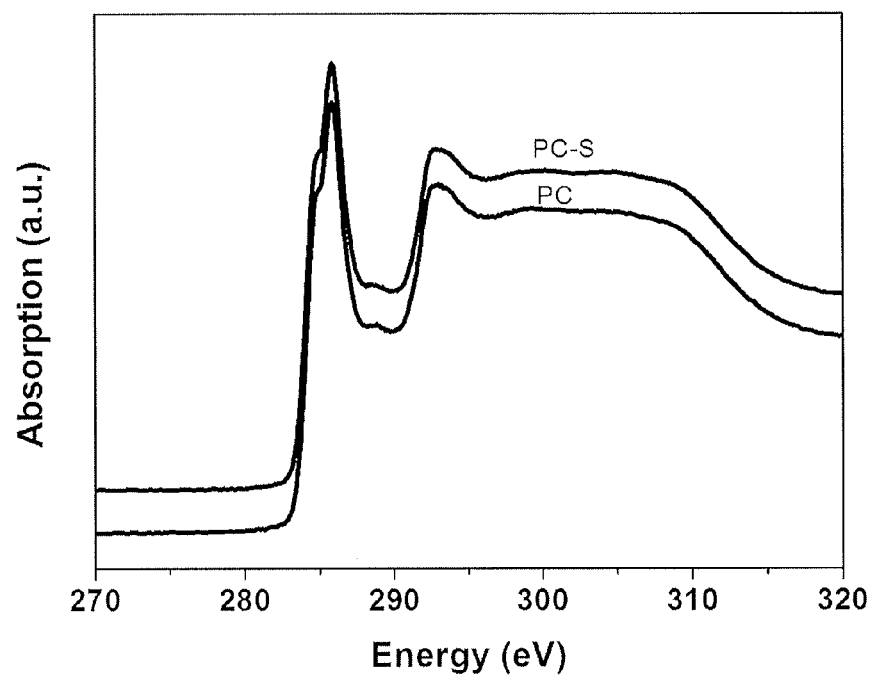
FIG. 6(A) shows C K-edge of XANES spectra of PC and PC-S2.
Figure 6B:
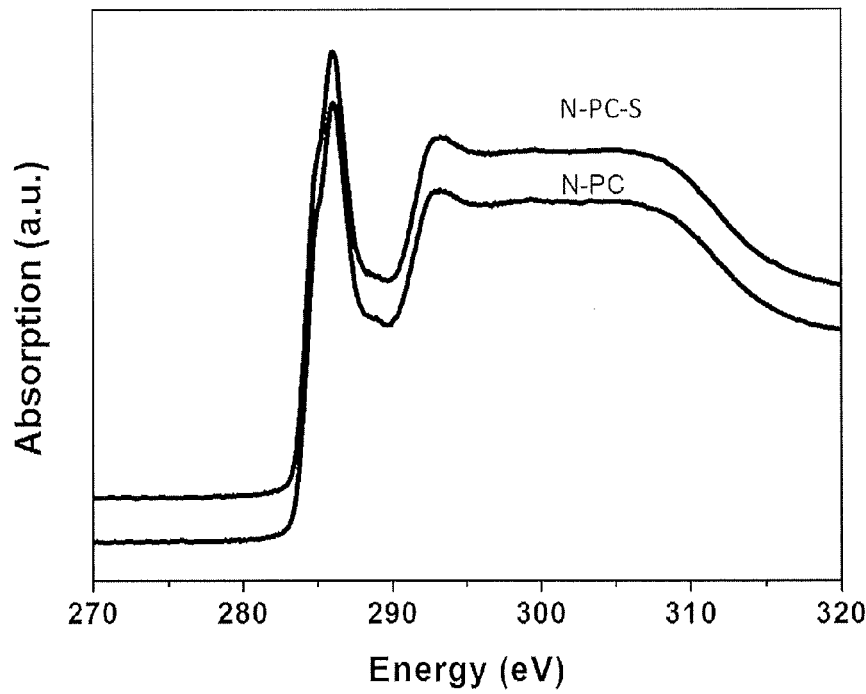
FIG. 6(B) shows N-PC and NPC-S2.
Figure 6C:
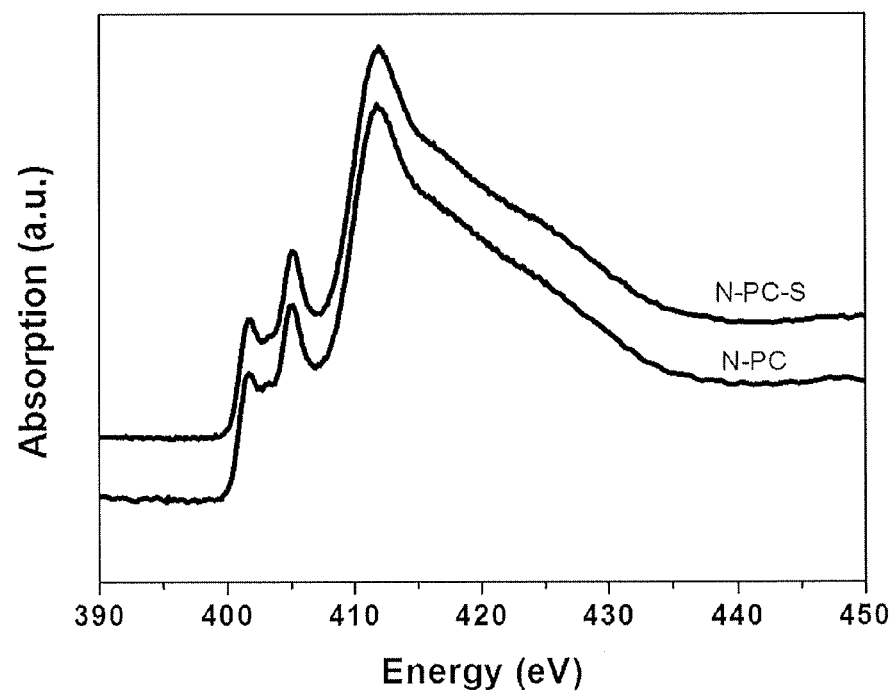
FIG. 6(C) shows N K-edge of XANES spectra of N-PC and N-PC-S2.
Figure 6D:
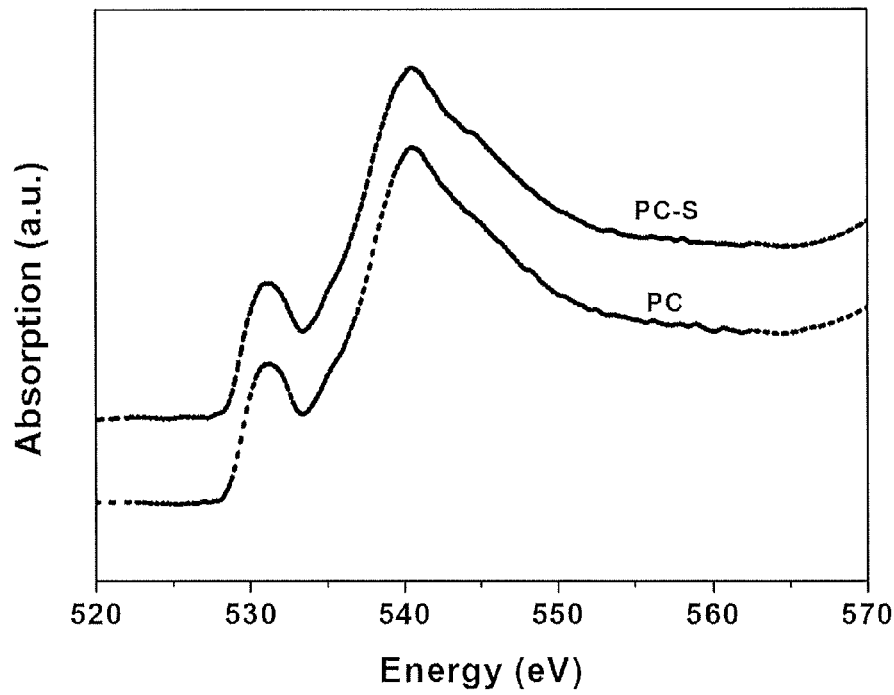
FIG. 6(D) shows O K-edge of XANES spectra of PC and PC-S2. Both PC-S2 and N-PC-S2 have 2 wt. % sulfur.

To more readily compare the adsorption ability of these adsorbents, the absorption amount of Super P was normalized to 1. The relative absorption value of N-PC shown in FIG. 5 is much higher than that of $Al_2O_3$ and non-nitrogen-doping mesoporous carbon, while above one order of Super P and SBA-15.

Figure 7:
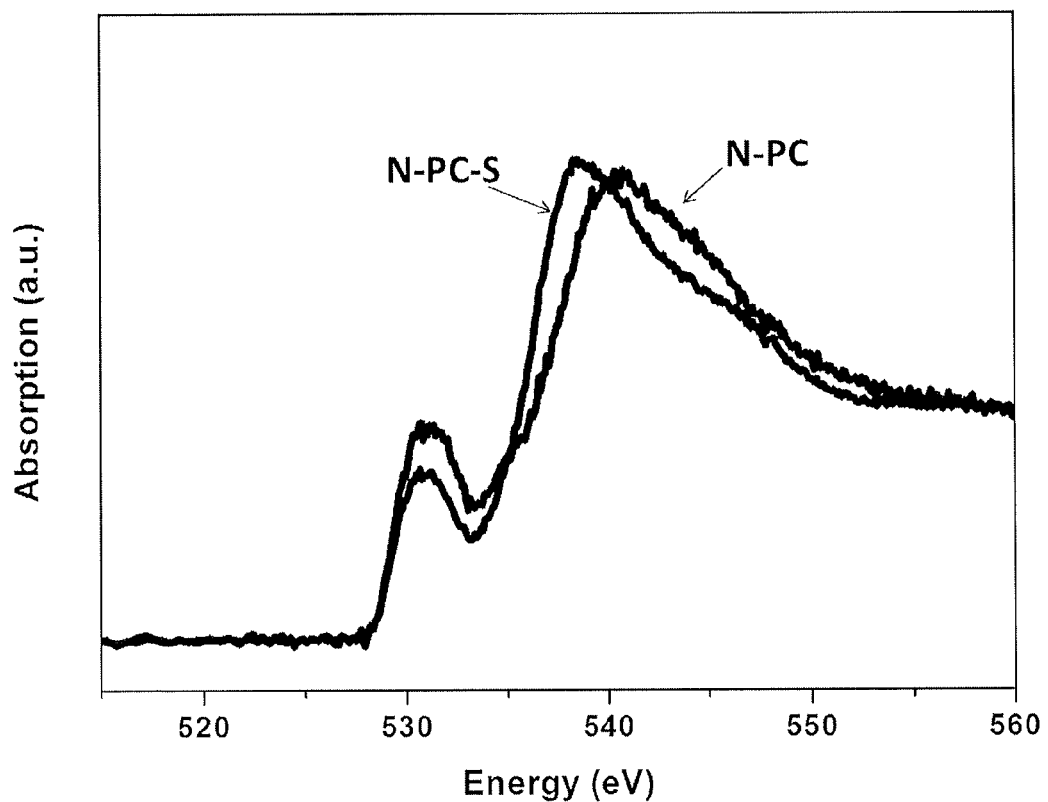
FIG. 7. O K-edge of XANES spectra of N-PC and N-PC-S nanocomposites.

We investigated adsorption of sulfur on N-PC. X-Ray absorption near edge structure spectroscopy (XANES) was performed on N-PC before and after sulfur loading, as XANES is very sensitive to local coordination structure around a specific element of interest. Almost no changes were observed in the C and N coordination structures of N-PC after sulfur loading (FIG. 6(A)-6(D)). However, there was a significant change in O coordination structure of N-PC after sulfur loading (FIG. 7). More ether-type oxygen functional groups and less carboxyl-type and/or carbonyl-type functional groups were present in N-PC-S compared with in N-PC based on data fitting with reference compounds (Table 1).

TABLE 1

Results of the quantitative elemental analysis of PC and N—PC

| Samples | Elements (%) | | | | |
|---|---|---|---|---|---|
|  | C | N | H | O | other |
| PC | 91.19 | — | 1.50 | 6.23 | 1.08 |
| N—PC | 83.65 | 6.20 | 1.62 | 6.89 | 1.64 |

Although not wishing to be bound by theory, we believe that the above results most likely indicate oxygen-sulfur bonding between N-PC and sulfur. On the other hand, there are no obvious changes in the coordination structures of O and C in mesoporous carbon (PC) with similar oxygen content after sulfur loading (Table 2), indicating that there is no significant chemical interaction between PC and sulfur. Based on the above results, nitrogen doping in PC can change the electronic structure of nearby oxygen atoms in the framework to promote the chemical interaction of the oxygen with sulfur. This strong interaction between X-PC and polysulfide facilitate relieving the "shuttle" effect and enhancing cycle life and capacity stability for Li—S batteries.

TABLE 2

Linear combination fitting of oxygen functional groups of N—PC and N—PC—S2

| Sample | Carbonyl | Carboxyl | Hydroxyl/Ether |
|---|---|---|---|
| N—PC | 16.0% | 54.9% | 31.4% |
| N—PC—S2 | 8.6% | 38.7% | 48.6% |

Note that in FIG. 2(C), oxygen functional groups on N-PC material before and after sulfur loading were determined via linear combination fitting of XANES spectra for those materials using reference spectra. All reference spectra were collected in partial electron yield mode at beamline U7A at NSLS. Two representative reference compounds were chosen for each type of functional group, namely the carbonyl group (polyvinylpyrrolidone and poly(vinyl methyl ketone)), carboxyl group (poly(ethylene-alt-maleic anhydride) and poly(acrylic acid)), and hydroxyl group (polyvinyl alcohol and poly(4-vinylphenol)). Fitting was done using the ATHENA data analysis software.

It is important to note that ether group XANES spectra have similar shapes to hydroxyl group spectra, making the two very difficult to distinguish. Therefore, ether and hydroxyl spectra were fit together and only the net fraction of these groups in the materials is presented here. The fitting results indicate a decrease of carboxyl groups and an increase of hydroxyl/ether groups after loading sulfur at 155° C. Please note that the sum of abundance was not forced to be 1 when performing the fitting, whereas a convergence at 1 is expected for a good fitting result.

Example 5

A Battery Comprising of a Negative Electrode, Electrolyte, and a Positive Electrode Using N-PC-S70

Figure 8A:
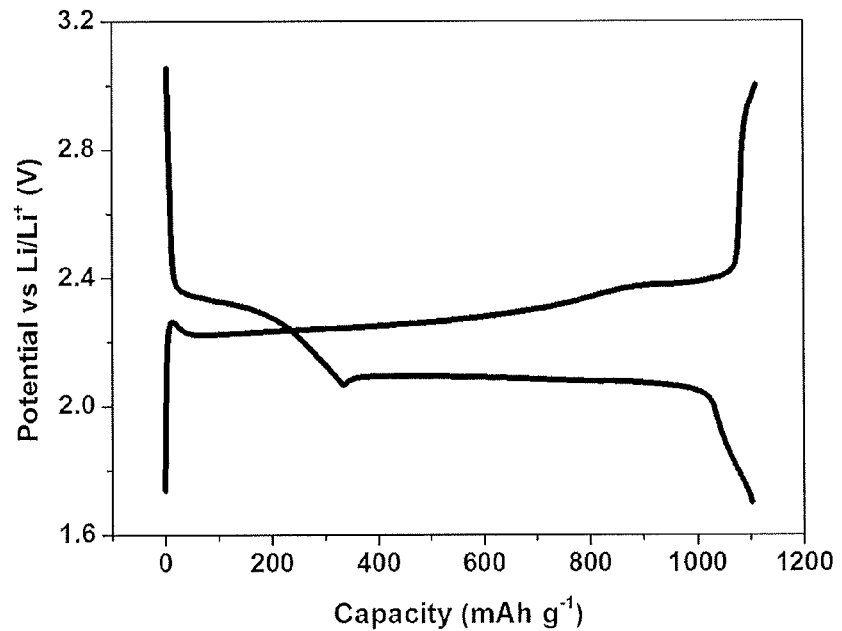
FIG. 8(A) shows a typical first cycle discharge-charge voltage-capacity profile of an N-PC-S70 nanocomposite cathode at a current density of 0.35 $mA/cm^2$.
Figure 8B:
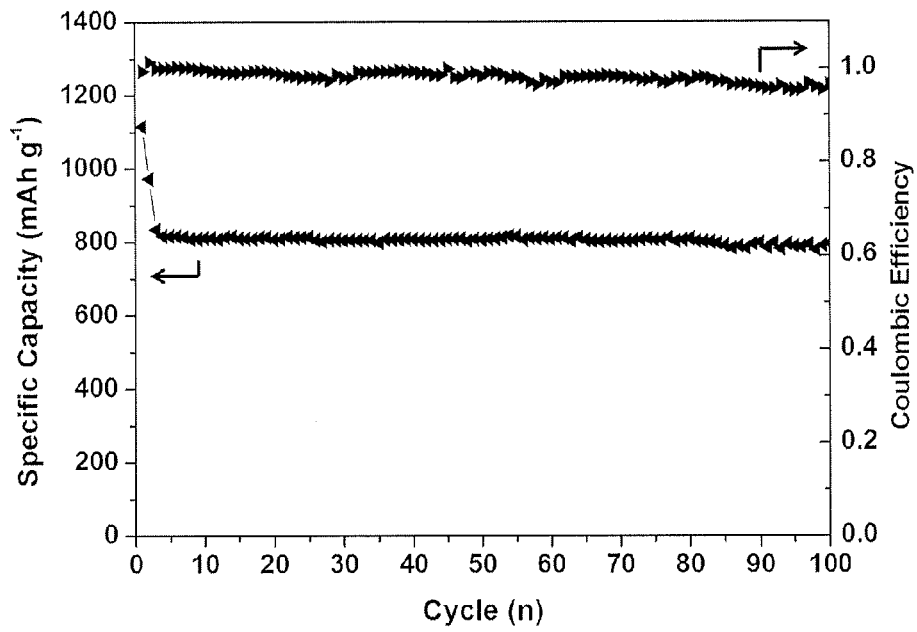
FIG. 8(B) shows cycle performance and coulombic efficiency of N-PC-S70 cycled at a current density of 0.35 $mA/cm^2$ for the first two cycles and 0.70 $mA/cm^2$ for the subsequent cycles.

Cycle life and coulombic efficiency of a N-PC-S70 nanocomposite cathode are shown in FIG. 8. N-PC-S70 delivers an initial specific capacity of 1100 mAh/g and coulombic efficiency of 99.4% at a current density of 0.35 mA/cm$^2$. After the first two cycles at 0.35 mA/cm$^2$, the cell was switched to 0.70 mA/cm2 for another 98 cycles. The capacity quickly stabilized at ~800 mAh/g and showed roughly 95% retention within 98 cycles at a current density of 0.70 mA/cm$^2$. That means only 0.05% capacity loss per cycle, which is outstanding compared to results for capacity loss per cycle reported in the prior art.

The excellent cycling stability of the N-PC-S70 cathode can be attributed to the synergetic effects of nitrogen-doping-induced chemical adsorption and the ability of the highly-porous carbon framework to trap soluble polysulfides. The high coulombic efficiency (96-99%) of the N-PC-S70 nanocomposite is probably due to both the $LiNO_3$ additive and nitrogen-doping-induced chemical adsorption. The $LiNO_3$ additive is known to promote the formation of a stable protective film on the lithium anode.

The effect of nitrogen doping on efficiency is further demonstrated at sulfur loading of 80 wt %, where sulfur are not confined within nanopores as indicated in XRD pattern of FIG. 2(C). To further illuminate the effect of nitrogen-doping-induced chemical adsorption on the performance of N-PC-S cathodes, we tested battery performance of N-PC with an increased sulfur loading of 80 wt. % (N-PC-S80) without the $LiNO_3$ additive and compared with two control cathodes: mesoporous carbon-S80 (PC-S80) and a carbon-sulfur composite prepared by ball milling commercial carbon (Super P® carbon from Timcal) with 80 wt. % sulfur (denoted SP-S80). Higher sulfur loading is expected to lower conductivity of carbon-sulfur cathodes, increase polysulfide dissolution and the shuttling effect, and lower coulombic efficiency.

Figure 9A:
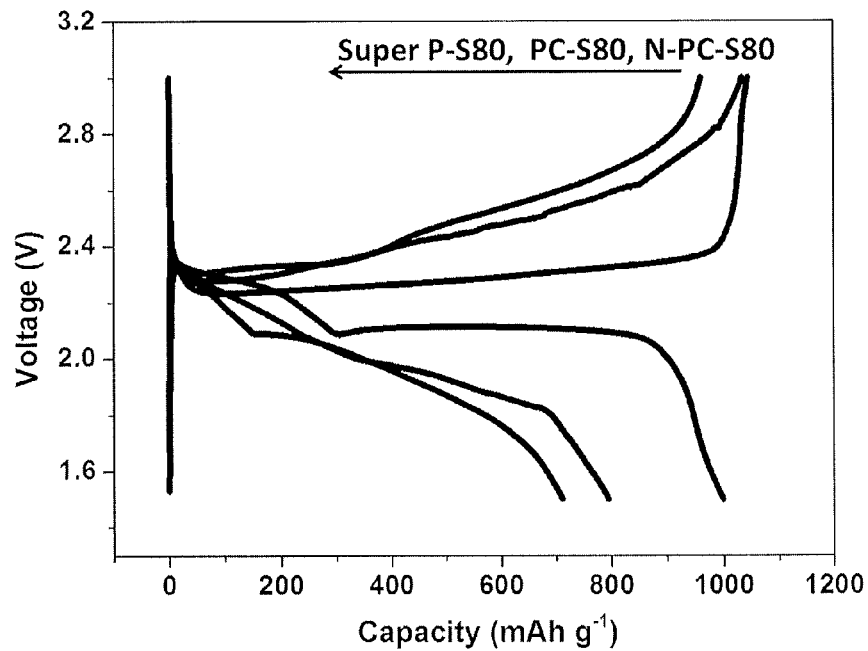
FIG. 9(A) shows initial discharge-charge voltage-capacity profiles and FIG. 9(B) shows cycling performance and coulombic efficiency of N-PC-S80, PC-S80, and SP-S80 cathodes at a current density of 0.18 $mA/cm^2$.
Figure 9B:
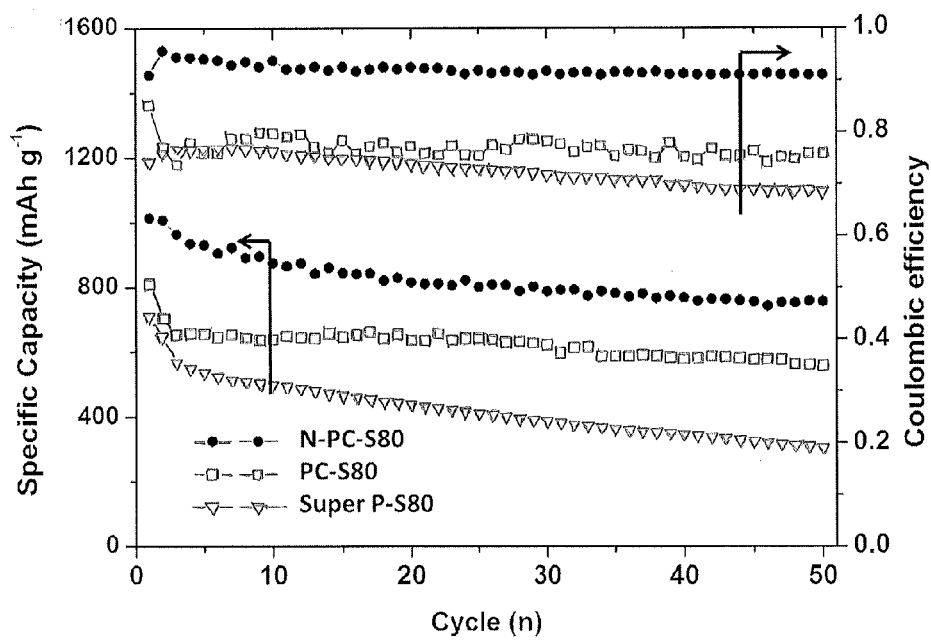
Figure 10:
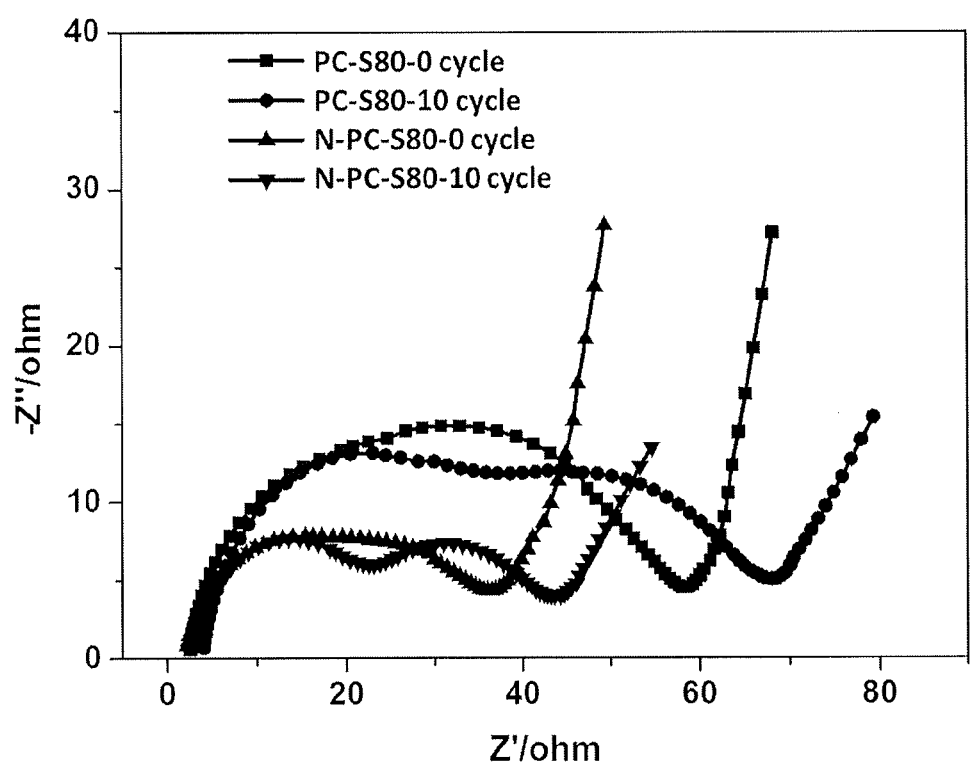
FIG. 10. Nyquist plots for PC-S80 and N-PC-S80 electrodes.

Charge/discharge voltage profiles show distinct differences between N-PC-S80 and the control cathodes, as shown in FIGS. 9(A) and 9(B). Significant polarization was observed in the charge/discharge profiles of both PC-S80 and SP-S80 due to decreased conductivity of the cathodes. In contrast, N-PC-S80 still clearly shows discharge plateaus of 2.3 V and 2.1 V, indicating much less severe polarization at this high sulfur loading. This was further confirmed by the much lower charge transfer resistance observed in electrochemical impedance spectra of N-PC compared to those of PC as shown in FIG. 10.

Before cycling, the semi-circle in the high frequency corresponds to the charge transfer resistance ($R_{ct}$) of the sulfur electrode. Two semi-circles appear after cycling; the semi-circle located at lower frequency is regarded as the Rct and the semi-circle at higher frequency represents the resistance of passivation films. The charge transfer-related semi-circle diameters of N-PC-S80 both before and after cycling are smaller than those of PC-S80, indicating N-PC-S80 electrodes have a lower charge transfer resistance than PC-S80 electrodes.

The initial discharge capacity of N-PC-S80 was also 1036 mAh g$^{-1}$, with a coulombic efficiency of over 90%, and capacity retention was 80% after 50 cycles (FIG. 4b). PC-S80 and SP-S80 show faster capacity fading and much lower coulombic efficiency. The difference in voltage profiles and coulombic efficiencies can be attributed to nitrogen-doping-induced chemical adsorption in N-PC-S80, which works in addition to the ability of the pores to contain sulfur. The chemical adsorption can facilitate uniform dispersion of sulfur and insoluble polysulfides on the surface of the carbon framework, decreasing charge transfer resistance, and retard diffusion of polysulfides away from the cathode, increasing coulombic efficiency during the charge/discharge process.

Example 6

A Battery Comprising of a Negative Electrode, Electrolyte, and a Positive Electrode using N-G-S60

Figure 11:
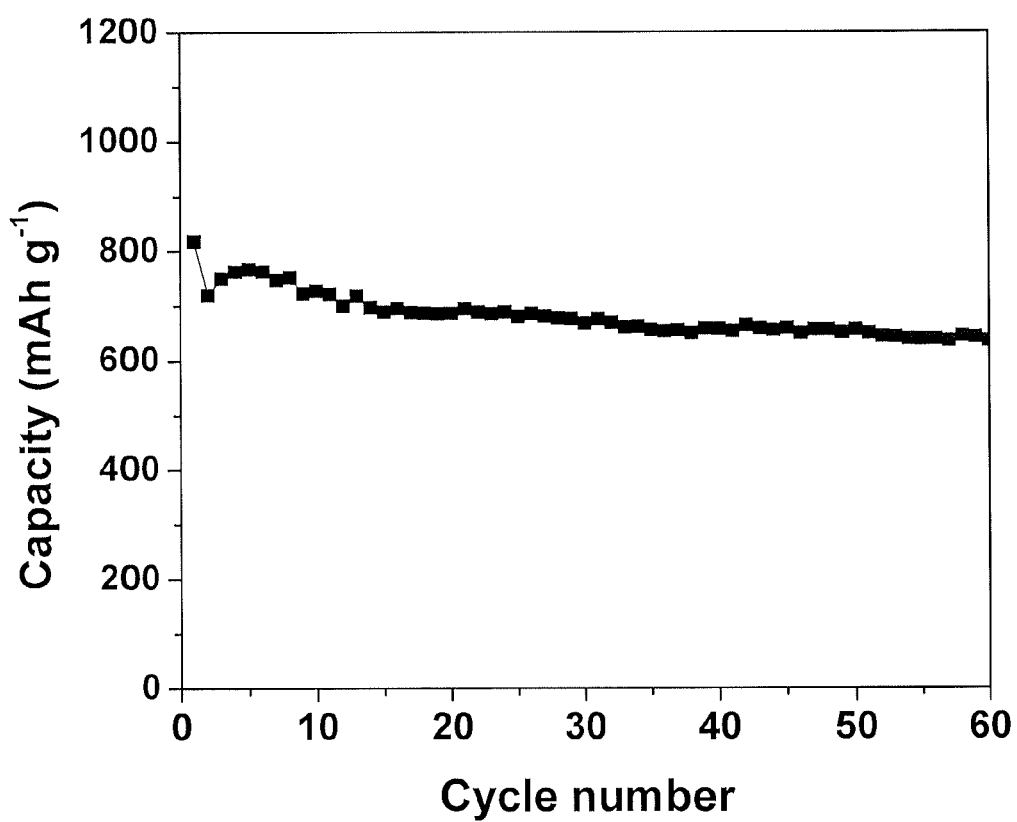
FIG. 11. Cycling performance of NG-S60 sulfur cathode at 168 mAh/g by using 1M LiTFSI in mixture of 1,3-dioxolane (DOL) and 1,2-dimethoxyethane (DME) (1:1, v/v) as electrolyte and $LiNO_3$ (0.2M) as additive.

The cycling ability was evaluated by using a mixture of 1,3-dioxolane (DOL) and 1,2-dimethoxyethane (DME) (1:1, v/v) as electrolyte and LiNO$_3$ (0.2M) as additive shown in FIG. 11. This N-G-S60 sulfur cathode shows an initial specific capacity above 800 mAh/g and has a good capacity retention (>78%) within 60 cycles.

We claim:

1. A material used as cathode for Li—S batteries comprising:
    a carbon structure;
    a heteroatom dopant integrated into the carbon structure; and
    sulfur, wherein said carbon and said heteroatom dopant are connected by covalent bonds, and wherein the sulfur is at least partly bonded to the carbon and the heteroatom dopant by chemisorption.

2. The material of claim 1, wherein said carbon is porous.

3. The material of claim 2, wherein said porous carbon comprises pores of a size less than 1 μm.

4. The material in claim 1, wherein said heteroatoms are selected from the group consisting of nitrogen, boron, phosphorous, oxygen, fluoride, sulfur, chloride, and combinations thereof.

5. The material of claim 1, comprising, by weight, less than 50% heteroatom dopant.

6. The material of claim 1, wherein the weight of the sulfur in the material is more than 5% and less than 100% by weight.

7. The material of claim 6, wherein said at least a portion of said sulfur is present as elemental sulfur.

8. The material of claim 1, wherein the dopant is nitrogen, and wherein the nitrogen and carbon are present in a ratio, by weight, ranging from 0.1 to 1.65 of nitrogen to carbon.

9. An electrode comprising the material of claim 1.

10. The electrode of claim 9, further comprising at least one binder, and at least one conductive additive.

11. A battery comprising:
    a negative electrode;
    an electrolyte; and
    a positive electrode according to claim 9, wherein said negative electrode and said positive electrode are placed into electrical communication by said electrolyte.

12. A material comprising:
    heteroatom-doped carbon;
    at least one of lithium sulfide and lithium polysulfides, wherein in said lithium polysulfides having the formula Li$_2$S$_x$, x is greater than 2;
    wherein said heteroatom-doped carbon includes carbon with a covalent bond to a heteroatom dopant; and
    wherein said at least one of lithium sulfide and lithium polysulfide is at least partly bonded to the doped carbon by chemisorption.

13. The material of claim 12, wherein said lithium sulfides and/or lithium polysulfides have a sulfur chain length from 1 to 8.

14. An electrode comprising the material of claim 12.

15. A battery comprising:
    a negative electrode;
    an electrolyte; and
    a positive electrode according to claim 14, wherein said negative electrode and said positive electrode are placed into electrical communication by said electrolyte.

16. The material of claim 1, wherein said heteroatoms are selected from the group consisting of boron, phosphorous, oxygen, fluoride, sulfur, chloride, and combinations thereof.

* * * * *